S. W. WILLIAMS & T. H. MARTIN.
BOLL WEEVIL EXTERMINATOR.
APPLICATION FILED OCT. 14, 1916.
1,209,528.
Patented Dec. 19, 1916.
2 SHEETS—SHEET 1.
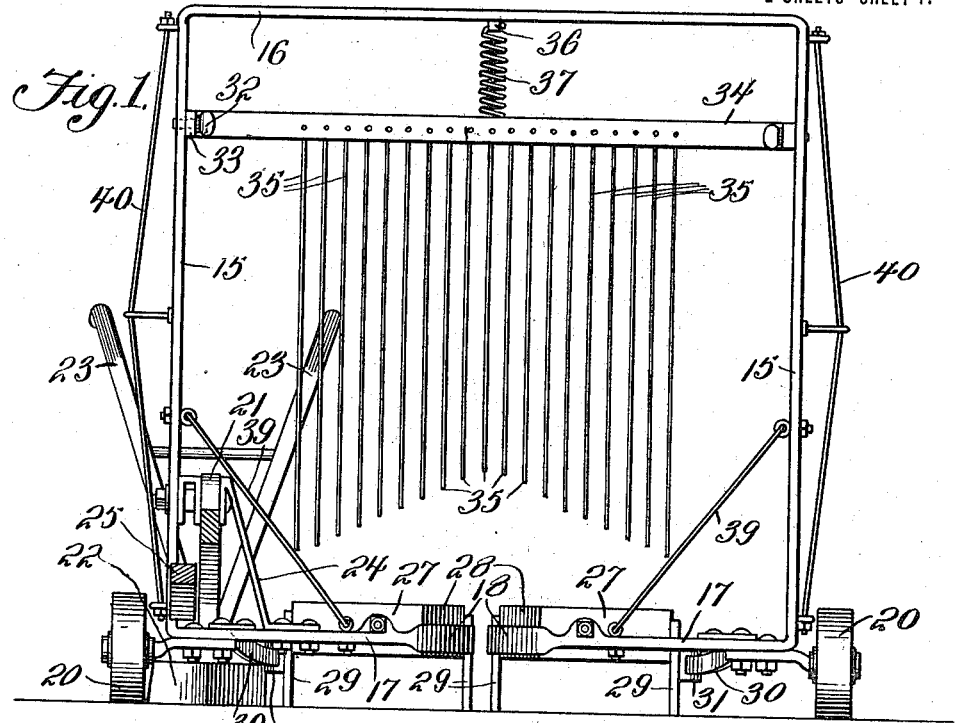
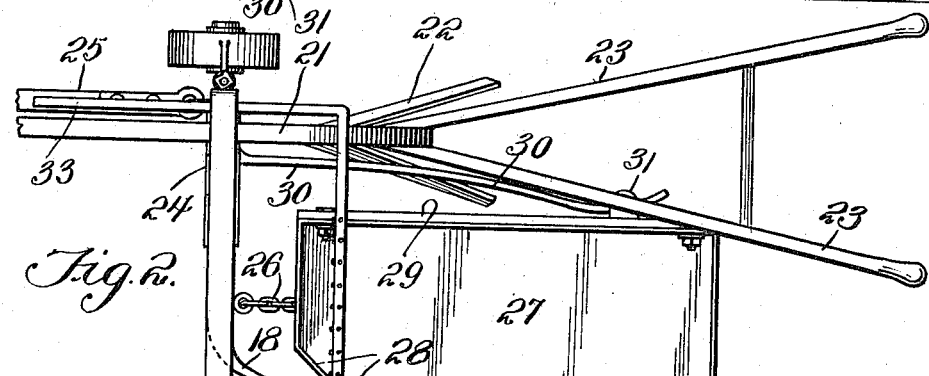
Witnesses
J. T. L. Wright
Wm. Bagger
Inventor
S. W. Williams
T. H. Martin
By Victor J. Evans
Attorney

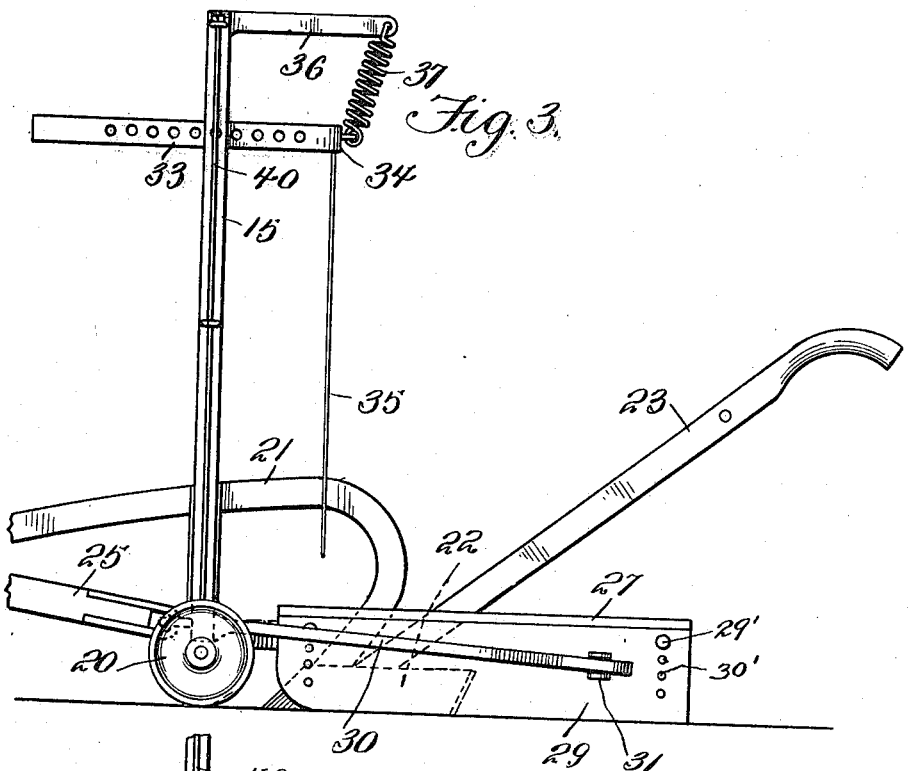
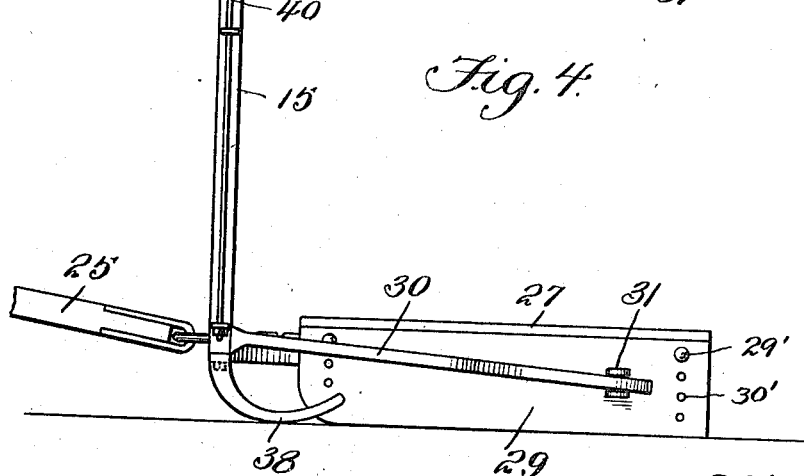

UNITED STATES PATENT OFFICE.

SILAS W. WILLIAMS AND THOMAS H. MARTIN, OF GORDO, ALABAMA.

BOLL-WEEVIL EXTERMINATOR.

1,209,528.

Specification of Letters Patent.

Patented Dec. 19, 1916.

Application filed October 14, 1916. Serial No. 125,616.

*To all whom it may concern:*

Be it known that SILAS W. WILLIAMS and THOMAS H. MARTIN, citizens of the United States, residing at Gordo, in the county of Pickens and State of Alabama, have invented new and useful Improvements in Boll-Weevil Exterminators, of which the following is a specification.

This invention relates to devices for exterminating noxious insects and particularly for exterminating boll weevils from cotton plants.

The invention has for its object to produce a boll weevil exterminator of simple and improved construction which may be inexpensively and effectively operated.

A further object of the invention is to produce a boll weevil exterminator which may be readily mounted upon and used in connection with a plow so that by a single operation the weevils may be exterminated and the cotton plowed or cultivated.

A further object of the invention is to produce a boll weevil exterminator in which the operating parts may be readily adjusted to the most advantageous position for successful operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a front elevation of a device constructed in accordance with the invention. Fig. 2 is a top plan view of the same. Fig. 3 is a side elevation. Fig. 4 is a side elevation illustrating a modification whereby runner shoes have been substituted for the supporting wheels.

Corresponding parts in the several figures are denoted by like characters of reference.

The main frame of the improved device, which is disposed in a substantial vertical plane, includes the side members 15, top member or cross bar 16 whereby the side members are connected together and spaced apart and the bottom members 17 that extend from the lower ends of the side members 15 inwardly in the direction of each other, the inner ends of said bottom members being spaced apart and provided with rearwardly extending curved guides 18 to permit the passage of the cotton stalks. At the lower corners of the frame, formed by the intersection of the side members 15 and bottom members 17, are secured stub axles on which supporting wheels 20 are mounted for rotation. The frame has been shown as being operatively connected with the beam 21 of an ordinary plow or cultivator, the blade of which is shown at 22, said plow beam being also provided with handles 23 whereby it may be guided. The frame may be connected with the beam 21 by means of conveniently arranged straps or braces 24, the beam being arranged close to one of the side members 15 so as not to interfere with the passage of the cotton stalks between the bottom members 17. The frame, however, has also been shown as being provided with a forwardly extending draft pole 25 whereby it may be pulled or manipulated when the use of the plow is not desired.

Connected with the bottom members 17 by flexible connections, such as links 26, are the pans or receptacles 27 having beveled front corners 28 to facilitate the passage of the cotton stalks. The pans 27 which are intended to drag on the ground are provided with ground engaging runners 29 which are secured adjustably on the outer side walls thereof by fastening members such as bolts 29' for the passage of which series of apertures 30' are provided to permit said runners to be raised or lowered so as to suit the inclination of the cotton ridge. The bottom members 17 are provided with spring bars 30 which are firmly secured on said bottom members near the side members 15, and which extend rearwardly with respect to the bottom members, the rearward ends of said spring bars being arranged to press against the runners secured on the outer side walls of the pans 27, thereby pressing the rearward ends of the pans in the direction of the cotton plants. The runners 29 may be provided with keepers 31 in which the free ends of the spring bars 30 are loosely fitted. These spring bars will also tend to maintain the main frame of the device in an upright position.

Mounted pivotally and adjustably on the side members 15 by means of pivot members such as bolts 32 or the like is a substantially horizontal frame 33 having a cross bar 34 with which rods or wires 35 constituting beaters are connected, said beaters extending loosely and gravitationally in a downward direction so as to engage the foliage of the cotton plants, thereby dislodging the weevils as well as loose leaves and punctured squares, the same dropping into the pans or receptacles 27 in which crude oil or other exterminating liquid may be placed. The top bar or cross bar 16 of the main frame has a rearwardly extending arm 36 which is connected by a coiled spring 37 with the cross bar 34 that carries the beaters, the object being to support the said cross bar in such a manner as to permit freedom of vibration which is desirable to promote the successful operation of the device. The spring 37 also assists in supporting the weight of the auxiliary frame of which the cross bar 34 is a part in the various positions to which the said frame may be adjusted, the position being governed by the size and condition of the plants that are to be operated upon.

In Fig. 4 of the drawings runner shoes 38 have been substituted for the wheels 20, it being found that under some conditions such runner shoes are desirable. These shoes, when used, will also assist in maintaining the main frame of the device in an upright position.

The main frame is provided with braces 39 connecting the side members 15 with the bottom members 17 for the purpose of stiffening and reinforcing the latter; the side members 15 are also reinforced by braces or trusses 40.

From the foregoing description taken in connection with the drawings hereto annexed, the operation of the device will be readily understood without a more extended explanation. The device is simple, inexpensive and thoroughly effective for the purposes for which it is provided.

Having thus described the invention, what is claimed as new, is:—

1. In a device of the class described, a vertically disposed frame comprising a top bar, side members and spaced bottom members having rearwardly extending guides, in combination with spaced pans or receptacles flexibly connected with the bottom members, and spring bars connected with the bottom members and extending rearwardly in engagement with the pans, said spring bars serving also to maintain the frame in an upright position.

2. In a device of the class described, a main frame comprising a top bar, side members and spaced bottom members having rearwardly extending guides, pans or receptacles flexibly connected with the bottom members and adapted to drag on the ground, runners adjustably connected with the outer side walls of the pans, and spring bars connected with and extending rearwardly from the bottom members of the frame.

3. In a device of the class described, a substantially vertical frame having ground engaging supporting means and spaced bottom members provided with rearwardly extending guides, pans or receptacles flexibly connected with the bottom members, a horizontal frame adjustably connected with the side members of the main frame and having a cross bar, and rods or wires depending from said cross bar and constituting beaters, the top bar of the main frame being provided with a rearwardly extending arm, and a spring connecting said arm with the beater carrying cross bar of the auxiliary frame.

4. In a device of the class described, a substantially vertical main frame including a top cross bar, side members and spaced bottom members having rearwardly extending guides, a draft beam or pole connected with one of the bottom members, spaced pans or receptacles flexibly connected with the bottom members, an auxiliary horizontal frame pivotally and adjustably connected with the side members of the main frame and having a cross bar, beaters depending from said cross bar, and resilient supporting means connecting the beater carrying cross bar with the main frame.

In testimony whereof we affix our signatures.

SILAS W. WILLIAMS.
THOMAS H. MARTIN.